United States Patent [19]

Kemp et al.

[11] Patent Number: 5,333,642
[45] Date of Patent: Aug. 2, 1994

[54] SAFETY VALVE MONITORING APPARATUS

[75] Inventors: George Kemp, Chatham; David M. Kemp, Jr., Pawnee, both of Ill.

[73] Assignee: Kemp Industrial Refrigeration, Inc., Chatham, Ill.

[21] Appl. No.: 103,072

[22] Filed: Aug. 6, 1993

[51] Int. Cl.[5] ............................................. F16K 37/00
[52] U.S. Cl. .................................... 137/557; 340/603;
340/626; 137/554
[58] Field of Search ................. 137/557, 554; 340/603,
340/626; 200/81.9 M; 116/273

[56] References Cited

U.S. PATENT DOCUMENTS

| | | | |
|---|---|---|---|
| 3,029,836 | 4/1962 | Gruner | 137/557 |
| 3,043,262 | 7/1962 | Gruner | 137/557 X |
| 3,651,827 | 3/1972 | Hammer et al. | 137/557 X |
| 4,074,696 | 2/1978 | Romanowski | 137/557 X |
| 4,533,908 | 8/1985 | Fujikawa | 137/557 |
| 5,235,324 | 8/1993 | Gagnebin | 340/626 |

Primary Examiner—John Rivell
Attorney, Agent, or Firm—Trexler, Bushnell, Giangiorgi & Blackstone, Ltd.

[57] ABSTRACT

An apparatus for monitoring the condition of a pressure relief safety valve, which has a magnetic ball shiftable from a home position by fluid under pressure when the relief valve opens, and an adjacent sensor responsive to shifting of the ball to provide a signal representing an open valve.

17 Claims, 2 Drawing Sheets

SAFETY VALVE MONITORING APPARATUS

The present invention relates to a novel apparatus for monitoring the condition of safety valves, and more particularly to a novel monitoring apparatus for an installation in which a plurality of safety valves are installed.

While features of the present invention may be incorporated in various systems, the invention is particularly suitable for use in refrigeration systems incorporating a plurality of compressors and related evaporators, receivers, condensers and other conventional components. As is known, receivers utilized in such a refrigeration system normally incorporate a safety valve so as to prevent an explosion in the event the pressure within the receiver builds up over a predetermined amount. In large refrigeration systems, such for example as may be found in soft drink bottling and meat packing plants, a plurality of compressors and related equipment, including receivers, are normally used, and each receiver includes its own safety valve. Such safety valves are usually connected to a common manifold which leads to a vent outside of the building in which the apparatus is located. In the event of the opening of one or more of such safety valves, it has heretofore been the general practice for the operator to manually check each valve to determine where the failure occurred. This practice is not only time-consuming, but may also require that the entire refrigeration system be shut down so that each check valve may be inspected.

Another problem sometimes occurring in prior systems is that a relief valve will only open momentarily and then attempt to close. However, in many instances, relief valves heretofore and in general use will not close completely, so that there is the possibility that the refrigerant, such as ammonia gas, will continually bleed out of the related receiver tank. In such a situation, the refrigeration system may remain operative, but there will be a continuous loss of ammonia gas.

SUMMARY OF THE INVENTION

It is a general object of the present invention to provide a novel monitoring system for a refrigeration or related installation utilizing a plurality of pressure vessels and associated relief valves, which system is constructed so that any one of such relief valves which opens may readily be identified.

A further object of the present invention is to provide a novel monitoring system for a plurality of relief valves or the like of the above-described type which will permit identification of any relief valve which may not be fully closed even though the system with which it is associated remains operative.

A still further object of the present invention is to provide a novel sensor for use in a monitoring system in the above-described type which will enable automatic identification of a relief valve that opens in whole or in part.

Still another object of the present invention is to provide a novel sensor for a monitoring system of the above-described type which will continue to provide an indication that a relief valve has opened even in the event that the relief valve subsequently closes in whole or in part.

A further object of the present invention is to provide a novel sensor of the above-described type which will enable an operator visually to determine whether or not a particular relief valve has opened.

Still another object of the present invention is to provide a novel sensor of the above-described type capable of providing a signal observable at a remote location as to the condition of the relief valve with which it is associated.

Another object of the present invention is to provide a novel monitoring system and sensor of the above-described type which is of relative simple and economical construction.

Other objects and advantages of the present invention will become apparent from the following detailed description of an illustrative embodiment of the present invention.

An installation incorporating features of the present invention may include a plurality of discrete refrigerating apparatus each of which includes among its conventional components a receiver tank for refrigerant such as ammonia under pressure. Each such receiver tank has associated therewith a pressure relief valve set to open at a predetermined pressure which is well below the bursting pressure of the vessel. In accordance with the present invention, a novel sensor is connected with the vent port of each such relief valve, which sensor includes a pressure actuated element shiftable from an initial or home position by fluid under pressure when its associated relief valve opens. The sensor incorporates a detector for determining when the element has been shifted from its home position, which detector is preferably capable of providing a signal which may be observed at a remote location. Furthermore, the sensor is preferably constructed so that the shiftable element cannot return to its home position without being manually reset so that an operator will be able to determine that a particular relief valve has opened even though the valve may subsequently close itself.

DETAILED DESCRIPTION OF AN ILLUSTRATIVE EMBODIMENT

Figure 1:
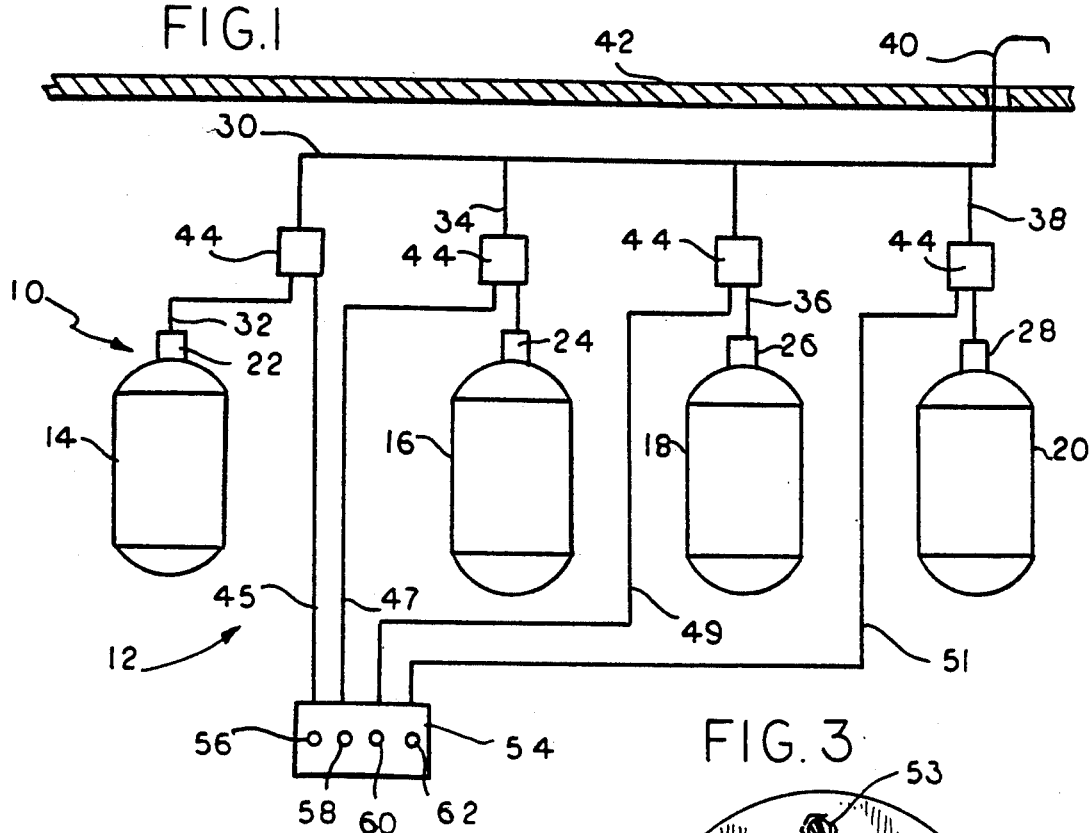
FIG. 1 is a fragmentary, schematic view of an installation incorporating a plurality of refrigerating apparatus each of which includes a receiver tank in association with a monitoring system incorporating features of the present invention.

Referring now more specifically to the drawings wherein like parts are designated by the same numerals throughout the various figures, a monitoring apparatus or system 10 is schematically shown in FIG. 1 for monitoring the status of pressure relief valves in a refrigeration system 12. The refrigeration system 12 may be of various known constructions such, for example, as ammonia refrigeration systems incorporating a compressor, a condenser, and an evaporator, a receiver or surge tank and piping and valves. For illustrative purposes, FIG. 1 shows a system incorporating four refrigeration units and of these units only the receivers or surge tanks 14, 16, 18, and 20 are shown. Systems of this type are frequently used in such places as soft drink bottling and meat packing plants, and include pressure relief valves 22, 24, 26, and 28 associated with each of the surge tanks or receivers.

The pressure relief valves may be of any known construction and typically include a valve element which is spring biased to a closed position and is adapted to shift to an open position whenever the pressure within the associated tank exceeds a predetermined level. In a typical installation, such relief valves are connected to a manifold 30 by branch conduits 32, 34, 36, and 38. The manifold 30 is vented to the outside of the building as indicated in FIG. 1 by conduit 40 which extends through a roof 42 of the building enclosing the refrigeration system.

As will be understood by those familiar with such installations, a relief valve will open when the pressure in its associated surge tank or receiver exceeds the set level. When the excess pressure is relieved, the relief valve will tend to close. However, the relief valve may well not fully reseat itself, so that the gas may continually bleed off. When, as in the illustrated embodiment, the refrigeration system includes a number of surge tanks and a number of relief valves, it is a problem for an operator to determine which of the valves has opened and also as to whether or not a valve which has opened has been fully reseated or closed.

In accordance with the present invention, the monitoring system 10 is provided so as to enable an operator easily to determine which relief valve has opened regardless of whether or not the valve has subsequently either partially or fully closed itself. The monitoring system 10 includes a sensor 44 associated with each of the surge tanks and more specifically, connected in the branch conduits 32, 34, 36, and 38, respectively. The sensors 44 are of identical construction as will be described in detail below and are adapted to provide a signal for indicating to an operator the status of the associated relief valve. More specifically, each of the sensors is electrically connected by wires 45, 47, 49, and 51, respectively, with a control panel 54, or other display unit. The control panel includes lights or other indicating visual or even audible means 56, 58, 60, and 62 for providing an indication of the status of the sensor.

Figure 2:
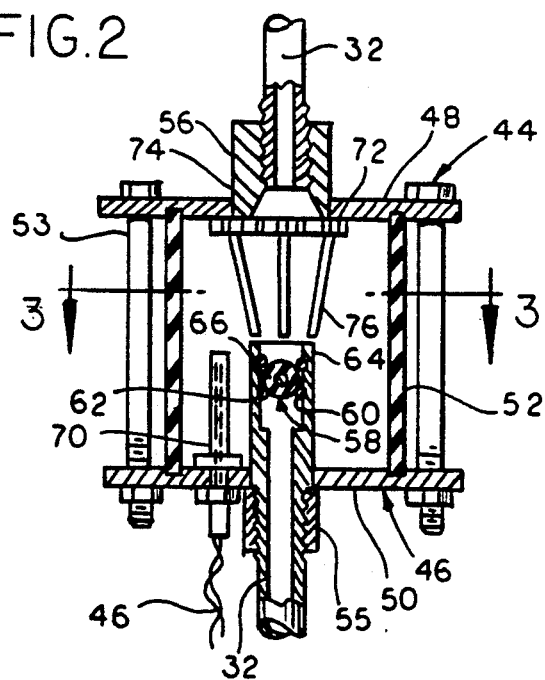
FIG. 2 is an enlarged, fragmentary, partial sectional view of a sensor incorporating features of the present invention of the type included in the system shown in FIG. 1.
Figure 3:
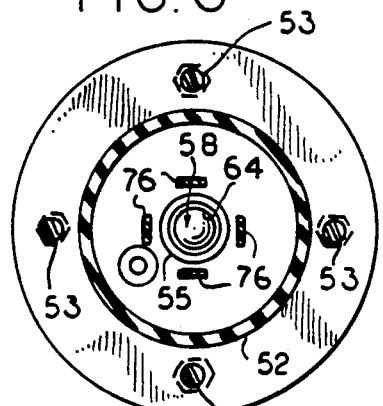
FIG. 3 is a fragmentary, sectional view taken generally along line 3—3 in FIG. 2.

Referring now to FIGS. 2 and 3, a sensor 44 incorporating one illustrative embodiment of the present invention is shown in detailed. More specifically, the sensor 44 comprises a housing 46 made up of opposite end plates 48 and 50 and a cylindrical body 52. The end plates are tied together by bolts 53. Preferably cylindrical body 52 is formed from a clear plastic material so that an operator may observe the condition of the internal portions of the sensor. An inlet fitting 55 extends through the end plates 50 and is connected to the relief valve through one of the branch conduits such as the conduit 32. An outlet fitting 56 extends through the opposite end 48 of the housing and is also connected to the branch conduit 32.

A gravity biased shiftable element or ball 58 is disposed within a tubular chamber 60 in the in fitting 55.

The ball 58 is normally located at a starting or home position which is determined by a shoulder 62 within the cavity 60. This shoulder may be provided by an O-ring, as indicated in FIG. 2, or simply by a shoulder machined in the internal wall of the fitting. The shiftable element or ball 58 is releasably retained in its starting or home position by another shoulder or protuberance 64 extending from the inner surface of the cavity 60. In the embodiment Shown, the protuberance 64 is provided by a resilient O-ring formed from rubber or plastic material which is of a type which will not be adversely affected by ammonia gas or other refrigerant material.

In the preferred embodiment, the shiftable element or ball has a central core 66 of a magnetic material. The core 66 is encased in a coating 68 of plastic or rubber material which is resistent to ammonia gas or other refrigerants. The coating or sheath 68 is sufficiently resilient to facilitate passage of the ball from the home or starting position through the protuberance 64 to an extended position under the influence of gas under pressure when the relief valve in an associated receiver or surge tank opens.

In order to provide an indication of the position of the ball or shiftable element 58, a detector, such as a magnetically operated Reed switch 70 of known construction is mounted within the housing adjacent the home position of the shiftable element. The Reed switch 70 is connected by the wire 46 with the control panel 54. The arrangement is such that an associated indicator light 56 responds to a signal from the Reed switch 70 for providing an indication of the position of the shiftable element 58 and thus providing an indication as to whether or not the associated relief valve has opened. Preferably, the Reed switch 70 and control panel 54 are wired so that the indicator light will be off when the shiftable element or ball is in its home position and the light will go on when the ball shifts away from the home position. If desired, the wiring could be such that the light would go on when the ball is in the home position and off when the ball has been extended.

The ball 58 and the O-ring or protuberance 64 are constructed so as to have a slight interference fit with each other. The interference fit is sufficient for maintaining the shiftable element or ball in its home position during shifting and handling and installation of the sensor. However, the interference fit is insufficient to retain the ball or shiftable element in the event that the pressure relief valve opens so that gas under pressure is admitted to the fitting 55. Specifically, the diameter of the shiftable element or ball is similar to the internal diameter of the chamber 60 so that gas under pressure will tend to force the ball outwardly from the chamber. The interference fit between the ball and the protuberance is such that the gas pressure required to shift the ball is only a small fraction of the pressure which is required to open the relief valve on the surge tank or receiver. For example, a typical pressure within the surge tank or receiver might be about 200 psi with the pressure relief valve set to open at a somewhat higher pressure consistent with safety requirements determined by the specific construction of the receiver vessel. On the other hand, the interference fit between the shiftable element or ball and the protuberance is such that a relatively small pressure which may, for example, be on the order of two or three psi is required for shifting the ball to its extended position. Thus, the sensor 44 will not detract in any way from the safety provided by the pressure relief valve.

It will be appreciated that when the relief valve opens with the gas pressure in the receiver or surge tank in excess of 200 lbs. psi, the shiftable element or ball 58 will be blown from the cavity 60 with considerable force. In order to prevent the ball from being projected against the outlet opening defined by the end fitting 56 and thus possibly clogging the vent conduit 32, a screen or other perforated member 72 is mounted within the housing so as to extend across the mouth or outlet opening 74 defined by the fitting 56.

In the event that the relief valve closes itself after being opened by excessive pressure, the shiftable element or ball 58 will fall by gravity back toward the cavity 60. In order to prevent the ball from returning to the home position, and thus eliminating the indication to the operator that the relief Valve opened, the embodiment shown in FIG. 2 is provided with a plurality of circularly arranged generally axially extending fingers 76 which define a tubular retainer into which the ball or shiftable element is wedged when it is blown from the cavity 60 by the gas under pressure. While the operation of the sensor is believed to be apparent from the description above, a brief summary is as follows.

When the sensor 44 is installed and the refrigeration system is operating normally, the shiftable element or magnetic ball 58 is retained at its home position within the chamber 60 by the protuberance or O-ring 64 as shown in FIG. 2. When in this position, the Reed switch 70 or other detector provides a signal or alternatively no signal to the control panel 54 so that the associated indicator light is in the desired condition indicating that the relief valve associated with the sensor is closed. In the event the relief valve subsequently opens, gas under pressure flows through the branch line 32 into the end fitting 55 and blows the shiftable element 58 from the chamber 60. As discussed above, the gas pressure when the relief valve opens is sufficient as to readily force the ball past the slight interference fit provided by the protuberance 64. When the ball is shifted out of the chamber, the Reed switch 70 provides a signal to the control panel for causing the indicator light to provide an indication that the relief valve has opened. Since the shiftable element or ball is preferably restrained or retained from falling back into chamber 60 to its home position, the indicator light will continue to provide an indication that the relief valve has opened regardless of whether or not the relief valve subsequently closes itself. This arrangement will enable an operator manually to check the relief valve to make sure that it is fully seated or to otherwise identify the receiver where the problem occured, so that proper maintenance may be effected.

Figure 4:
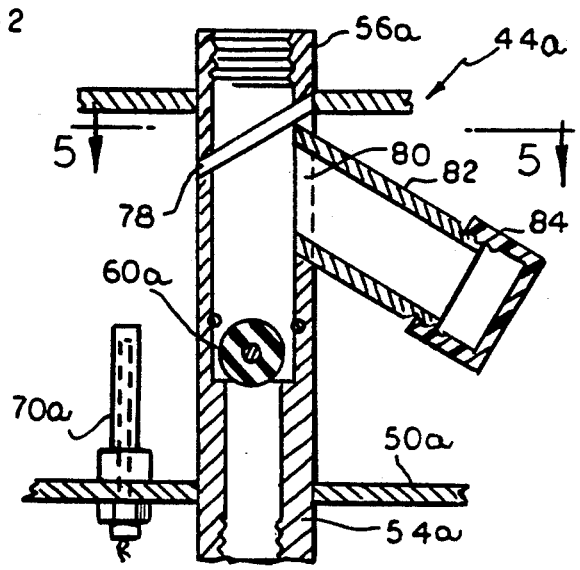
FIG. 4 is a fragmentary, partial sectional view showing a modified form of a sensor incorporating features with the present invention.
Figure 5:
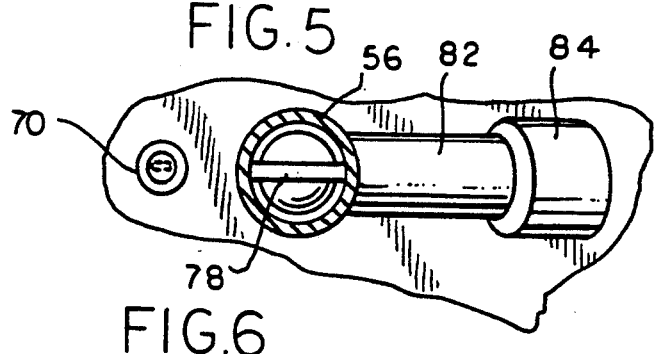
FIG. 5 is a fragmentary, sectional view taken generally along line 5—5 in FIG. 5.

Referring now to FIGS. 4 and 5, a modified embodiment of the sensor 44 is shown. In this embodiment, parts corresponding to those described above are indicated by the same reference numerals with the suffix "a" added. This embodiment differs primarily in the specific construction of means for preventing the ball from returning to the home position. More specifically, the outlet end fitting 56a is extended inwardly so that it abuts or is joined to the inner end of the fitting 55a so as to provide a continuous conduit. A deflector rod 78 extends across the conduit for deflecting the ball or shiftable element through an outlet port 80 in the side of the inner extension of the fitting 56a so that the ball cannot return to the home position. This modification may be included in the housing of FIG. 2 or, alternatively, the housing may be eliminated and be replaced by a diagonally downwardly extending pipe 82 communicating with the opening 80 and ending in a cup 84. The cup 84 may be formed from a clear plastic material so that an operator can see whether or not the shiftable element or ball has been ejected from the home position.

Figure 6:
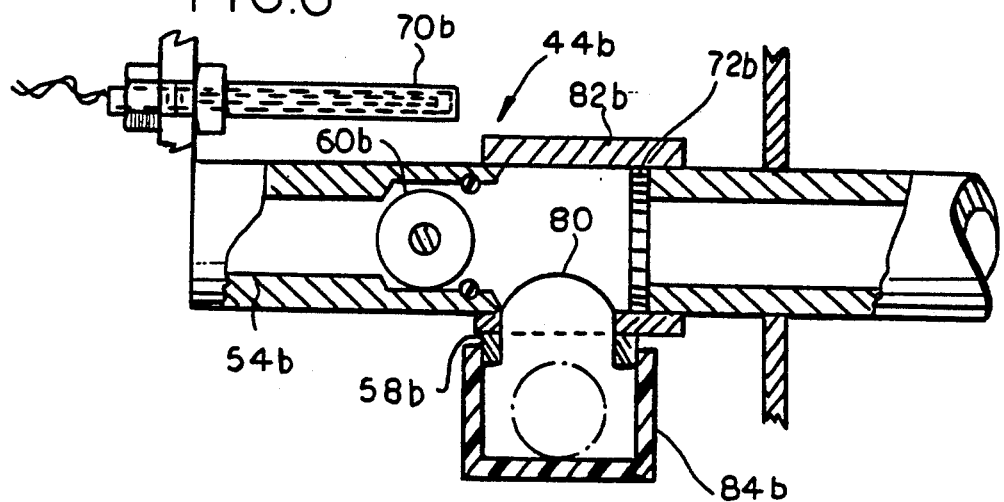
FIG. 6 is a fragmentary, partial sectional view showing a further modified form of a sensor incorporating features of the present invention.

FIG. 6 shows another embodiment of the present invention which is similar to the structures described above as indicated by the application of identical reference numerals, with the suffix "b" added to corresponding elements. The sensor of this embodiment is particularly suitable for use in situations where it is desirable to install the sensor in a horizontal rather than upright or vertical position. Thus, a fitting 82b is provided at the end of the inlet fitting 55b for presenting a downwardly facing outlet opening 80b into which the ball or shiftable element will fall as it emerges from the chamber 60B.

Figure 7:
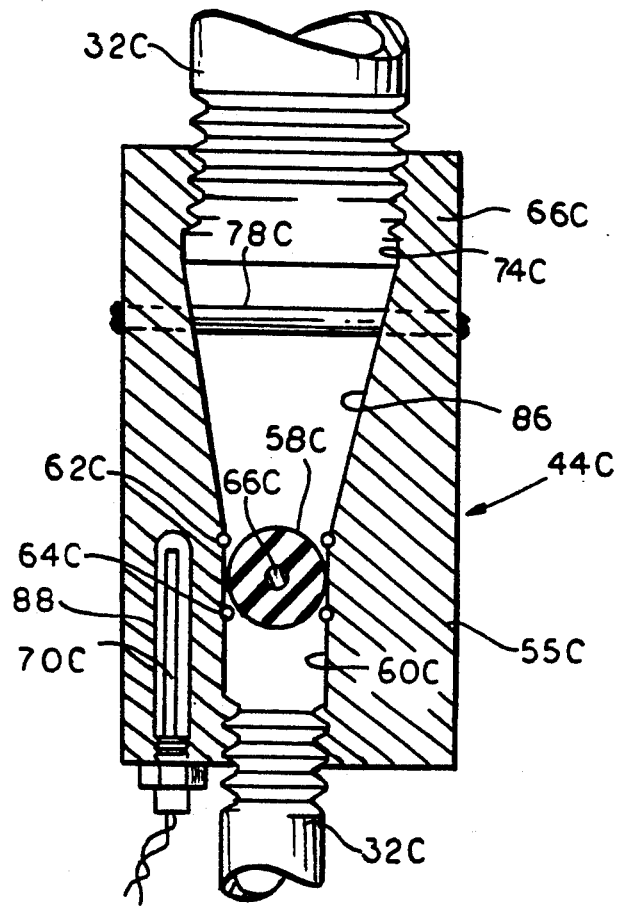
FIG. 7 is an enlarged, partial sectional view showing still another sensor modification.

FIG. 7 shows still another embodiment of a sensor contemplated by the present invention in which elements corresponding to those described above are indicated by the same reference numerals with the suffix "c" added. In this embodiment, the inlet and outlet fittings 55c and 56c are formed from a single piece of non-magnetic material, such, for example, as stainless steel. The material is machined to provide the ball chamber 60c and the outlet mouth 74c, which are joined by an outwardly tapering or flaring internal wall 86. A pin 78c traverses the passage defined by the wall 86 for preventing the ball 58c from entering the outlet 74c.

In the event the sensor 44c is installed in a horizontal position, the tapered wall 86 will act as a pocket preventing the return of the ball 58c to its home position after the associated pressure relief valve opens. In the event the sensor 44c is installed in an upright position, the ball 58c will still be restrained from freely returning to its home position because of the interference fit with the annular protuberance or O-ring 62c. As before, the interference fit will permit the ball to be easily blown from its home position, but is sufficient to prevent the ball from reentering the cavity 60c without manual assistance.

Also, in the embodiment of FIG. 7, the type of housing described above in connection with FIG. 1 is replaced by increasing the thickness of the fitting portion 55c and forming a chamber or bore 88 for receiving and housing the Reed switch 70c.

While preferred and illustrative embodiments of the present invention have been shown and described herein, various modifications may be made without departing from the spirit and scope of the appended claims.

The invention is claimed as follows:

1. In combination with a normally closed fluid pressure safety valve having a vent, a sensor for detecting opening of said valve, said sensor comprising a fluid conduit connected with said vent, a shiftable element within said conduit moveable from a home position by fluid under pressure upon opening of said safety valve, a structure preventing return of said element to said home position upon subsequently closing of the safety valve.

2. A combination, as defined in claim 1, which includes structure retaining said shiftable element in said home position in the absence of fluid under pressure from said safety valve.

3. A combination, as defined in claim 2, wherein said structure retaining said element comprises said conduit extending upwardly at said home position so that the shiftable element is maintained at said home position by gravity.

4. A combination, as defined in claim 2, wherein said structure retaining said element comprises a protuberance projecting from an inner wall of said conduit and releasable engaging said element.

5. A combination, as defined in claim 2, wherein said structure retaining said element comprises an interference fit between said element and an inner wall of said conduit.

6. A combination, as defined in claim 2, wherein said structure retaining said element comprises a resiliently yieldable surface on said element engagable with said conduit.

7. A combination, as defined in claim 1, wherein said structure for preventing return of said element comprises means wedgedly receiving said element upon said element being blown from said home position.

8. A combination, as defined in claim 1, wherein said structure for preventing return of said element comprises a lateral opening in. Said conduit through which said element is blown when moved from said home position.

9. A combination, as defined in claim 1, which includes a detector for providing a signal when said element is moved from said home position.

10. A combination, as defined in claim 9, wherein said element comprises a magnetic element and wherein said detector is responsive to said magnetic element.

11. A sensor for detecting opening of a pressure relief valve having a vent comprising a conduit defining a chamber connectable with said vent, a shiftable element disposed at a home position in said chamber and moveable from said home position by fluid under pressure emanating from said vent when the relief valve is opened, means adjacent said chamber and responsive to the presence or absence of said shiftable element at said home position for providing an indication of the location of said shiftable element, and means for preventing return of the shiftable element to said home position upon closing of the relief valve.

12. A sensor, as defined in claim 11, wherein said shiftable element includes magnetic material, and said means responsive to the shiftable element comprises a detector responsive to said magnetic material.

13. A sensor, as defined in claim 11, wherein said means for preventing return of said shiftable element comprises a protuberance having an interference fit with said shiftable element.

14. A sensor, as defined in claim 11, wherein said means for preventing return of said shiftable element comprises a laterally extending passage for receiving the shiftable element.

15. A sensor, as defined in claim 14, wherein said laterally extending passage comprises a laterally extending tube.

16. A sensor, as defined in claim 14, wherein said laterally extending passage comprises a flaring internal wall.

17. A sensor, as defined in claim 11, wherein said conduit has an outlet, said sensor further including means traversing said conduit for preventing said shiftable element from entering said outlet.

* * * * *

UNITED STATES PATENT AND TRADEMARK OFFICE
CERTIFICATE OF CORRECTION

PATENT NO. : 5,333,642
DATED : August 2, 1994
INVENTOR(S) : George Kemp and David M. Kemp, Jr.

It is certified that error appears in the above-indentified patent and that said Letters Patent is hereby corrected as shown below:

Column 4, Line 9 "Shown" should read — shown —

Column 7, Line 22 "opening in. Said" should read — opening in said —

Signed and Sealed this

Twenty-ninth Day of November, 1994

Attest:

BRUCE LEHMAN

*Attesting Officer*   *Commissioner of Patents and Trademarks*